No. 853,237. PATENTED MAY 14, 1907.
G. S. GRAY.
NUT LOCK.
APPLICATION FILED AUG. 7, 1906.

Witnesses:
Gladys Ward.
E. Behel.

Inventor:
George S. Gray.
By A. T. Behel
Atty.

UNITED STATES PATENT OFFICE.

GEORGE S. GRAY, OF BELOIT, WISCONSIN.

NUT-LOCK.

No. 853,237. Specification of Letters Patent. Patented May 14, 1907.

Application filed August 7, 1906. Serial No. 329,594.

*To all whom it may concern:*

Be it known that I, GEORGE S. GRAY, a citizen of the United States, residing at Beloit, in the county of Rock and State of Wisconsin, have invented certain new and useful Improvements in Nut-Locks, of which the following is a specification.

The object of this invention is to provide a device to be placed between a nut and a suitable support which will prevent the loosening of the nut.

Figure 1:
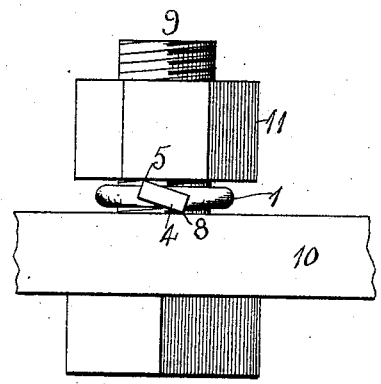
Figure 2:
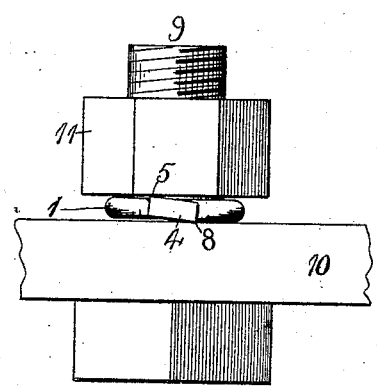
Figure 3:
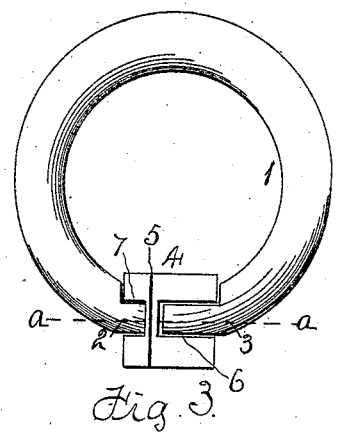
Figure 4:
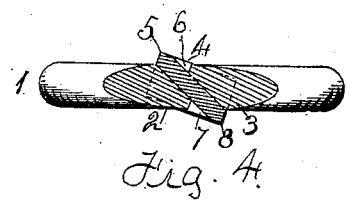
Figure 6:
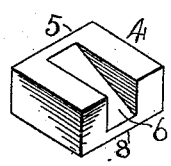
Figure 5:
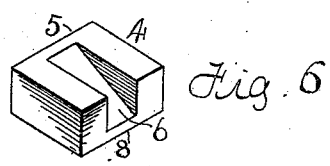

In the accompanying drawings, Figure 1 is a side elevation of my improved nut lock before pressure is brought to bear upon the parts. Fig. 2 is a similar elevation in which the parts are firmly seated. Fig. 3 is a plan view of my improved nut lock. Fig. 4 is a vertical section on dotted line *a a* Fig. 3. Fig. 5 is a similar section, but in which the gripping plate is depressed. Fig. 6 is a perspective view of the gripping plate.

My improvements consist of the open ring 1, having its ends 2 and 3 beveled, and extending parallel with one another. A gripping plate 4 is rectangular in form, and is provided with two grooves 6 and 7 located in opposite faces of the plate. These grooves are cut diagonally through the plate as shown at Figs. 4, 5 and 6 and leave two edges 5 and 8 full. The plate 4 is of steel and hardened.

The gripping plate 4 is placed in connection with the ends of the ring by an end located in one of the grooves.

The bolt 9 is passed through the support 10. The ring 1 with the gripping plate 4 in connection therewith is placed over the projecting end of the bolt and a nut 11 is turned down against the gripping plate as shown as Fig. 2. The pressure of the nut against the gripping plate will tend to place the plate into nearly a horizontal position. The open ring will yield to permit the gripping plate to assume this position. The action of the spring of the ring is to hold the gripping plate in the position shown at Figs. 1, 3 and 4 but will yield when pressure is brought to bear against the plate as shown at Figs. 2 and 5. The edges of the gripping plate will sink into the face of the support 10 and the inner face of the nut 11, when the nut is turned in a direction to loosen it.

By this construction of nut lock, it will be impossible to remove the nut without breaking or destroying the lock.

I claim as my invention.

1. A nut lock comprising an open ring and a gripping plate located adjacent and diagonal to the ends of the ring.

2. A nut lock comprising an open ring and a gripping plate supported by the ends of the ring in a diagonal manner.

3. A nut lock comprising an open ring and a gripping plate, the ends of the ring located diagonally and the gripping plate having diagonally arranged surfaces receiving the ends of the ring.

4. A nut lock comprising an open ring and a gripping plate, the gripping plate having grooves extending diagonal to its length and within which the ends of the ring are located.

5. A nut lock comprising an open ring, and a gripping plate supported by the ends of the ring, and located diagonally to the ring.

GEORGE S. GRAY.

Witnesses:
 JOHN C. ROOD,
 E. LIPMAN.